March 10, 1964

C. P. DE BIASI 3,124,274

SPREADER WITH ROTATABLE HOPPER

Filed July 25, 1961

Charles P. deBiasi
INVENTOR.

BY
Attorneys

United States Patent Office 3,124,274
Patented Mar. 10, 1964

3,124,274
SPREADER WITH ROTATABLE HOPPER
Charles P. de Biasi, 74 Braman Road, Waterford, Conn.
Filed July 25, 1961, Ser. No. 126,704
3 Claims. (Cl. 222—136)

The present invention generally relates to a material spreader and more particularly to a spreader having a generally cylindrical drum or body rotatable about a longitudinal axis for discharging the material either to the rear or to the front thereof depending upon the particular construction of the hopper.

Present day permanent type bodies constructed especially for purposes of spreading material normally include a generally V-shaped body having some type of conveyor along the bottom thereof for conveying the material to the rear of the body for subsequent discharge by a suitable spreading mechanism. In lieu of this type of body, one of the primary objects of the present invention is to provide a spreader having a rotatable cylindrical body mounted thereon for rotation generally about a longitudinal axis with the inside of the body having mixing and discharging blades thereon, this construction having many advantages over the conventional V-type of hopper body. Such advantages involve an increase in capacity due to its particular shape, the elimination of the inherent tendency of the material to stick to the sloping sides of the conventional shaped body, provides a mixing device whereby various materials may be disposed in the cylinder in the desired proportion and a substantially perfect mixture is accomplished by rotation of the cylinder. With this assembly, abrasives may be spread for snow and ice control, such abrasives normally being mixed with chemicals and the present invention will provide a mixture of such ingredients and also will tend to break up or wear out frozen lumps during the mixing operation.

Another object of advantage of the present invention is the elimination of considerable wear that occurs in conjunction with the movable components of the conventional V-shaped hopper in view of the simplicity of construction and economy in fabrication of the invention.

Another very important feature of the present invention is the provision by which the spreading operation may be conducted from the front or the rear by merely reversing the rotation of the drum. For example, a spreader at the left front of the drum may be employed and is easily fed by the particular construction of the rotatable drum.

Another important object of the present invention is the provision of a drum having a partition or divider therein for maintaining materials separate in a desired proportion whereby one material may be spread from the rear of the truck while another material may be spread from the front of the drum thus enabling different proportions of ingredients to be spread upon a roadway surface without premixing such ingredients.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a transverse, sectional view taken substantially upon a plane passing along section line 4—4 of FIGURE 3.

Figure 1:
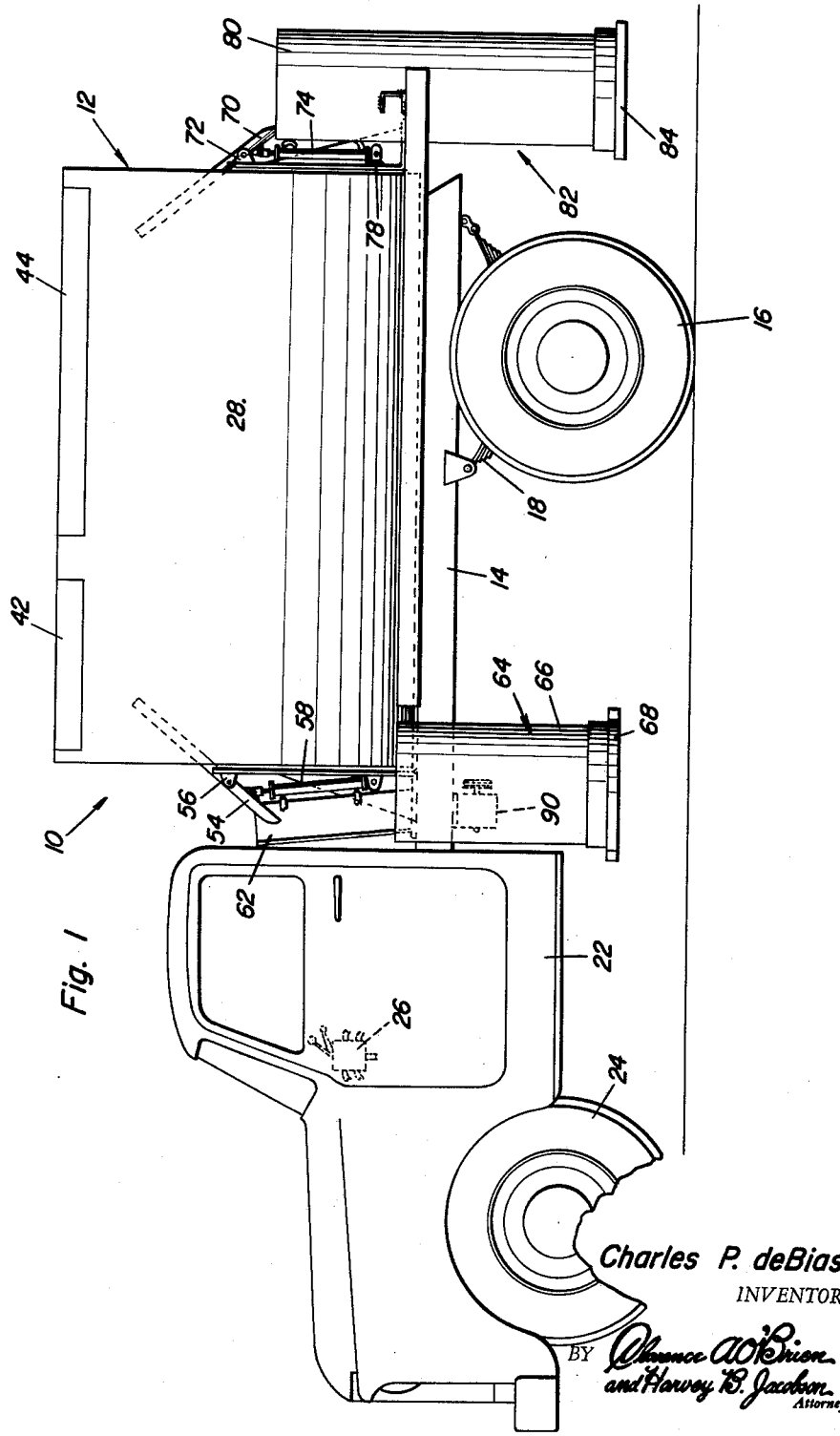
FIGURE 1 is a side elevational view of a spreader embodying the principles of the present invention therein.
Figure 2:
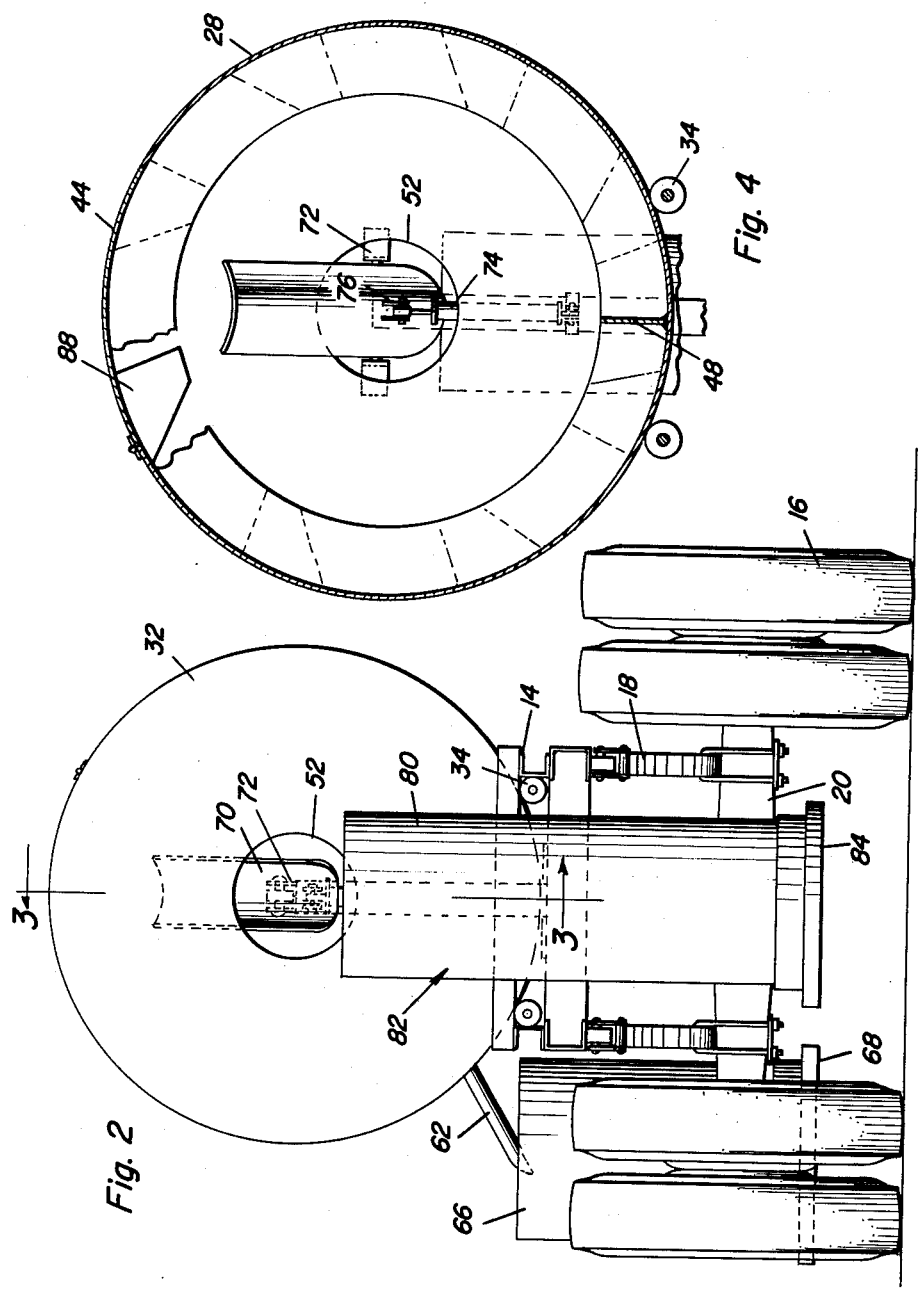
FIGURE 2 is a rear view of the spreader.

Referring now specifically to the drawings, the numeral 10 generally designates the spreader of the present invention which comprises a rotatable cylindrical drum 12 mounted on a supporting frame 14. The supporting frame 14 also carries the usual rear driving wheels 16, spring assemblies 18, and axle housing 20.

The front of the frame 14 is provided with an operator's cab 22, front steerable wheels 24 and a control valve assembly 26 disposed interior of the cab for operation by the driver for controlling the various components of the invention.

The cylindrical drum 12 comprises a cylindrical peripheral wall portion 28 and circular end wall portions 30 and 32. The cylindrical peripheral wall 28 is rotatably supported by a plurality of rollers 34 supported from the frame 14 in any suitable manner and rollingly contacting the cylindrical drum wall 28 at peripherally or arcuately spaced locations at the bottom center thereof thus retaining the drum in position and also supporting the drum for rotation. Suitable means may be provided for preventing longitudinal movement of the drum in relation to the frame whereby the drum is rotatably disposed and supported on the frame. Suitable means (not shown) is provided for driving the drum 12 so that it rotates about its longitudinal axis. Such means may be in the form of conventional driving means employed with concrete transit mixers such as a second engine mounted on the frame rearwardly of the cab or by virtue of a power take-off assembly such as is disclosed in Patent No. 2,680,377. Another type of drive means may be a hydraulic motor powered from a hydraulic pump connected with the motor of the truck type vehicle.

Disposed interiorly of the drum 12 is a circular partition wall portion 36 dividing the drum in a front compartment 38 and a rear compartment 40. The front compartment 38 is provided with an access door 42 and the rear compartment 40 is provided with an access door 44 which access doors are arcuate and hingedly mounted and secured in place by suitable latch means.

Disposed in the compartment 38 is a spiral deflector blade 46 and disposed in the compartment 40 are spiral deflector blades 48 extending inwardly from the peripheral wall 28. The deflector blades 46 and 48 are in the form of internal augers, which have an inclination toward the respective end walls 30 and 32. Thus, during rotation of the drum 12, the deflector blades 46 and 48 will move the material therein toward the respective end walls 30 and 32 or the partition wall.

Figure 3:
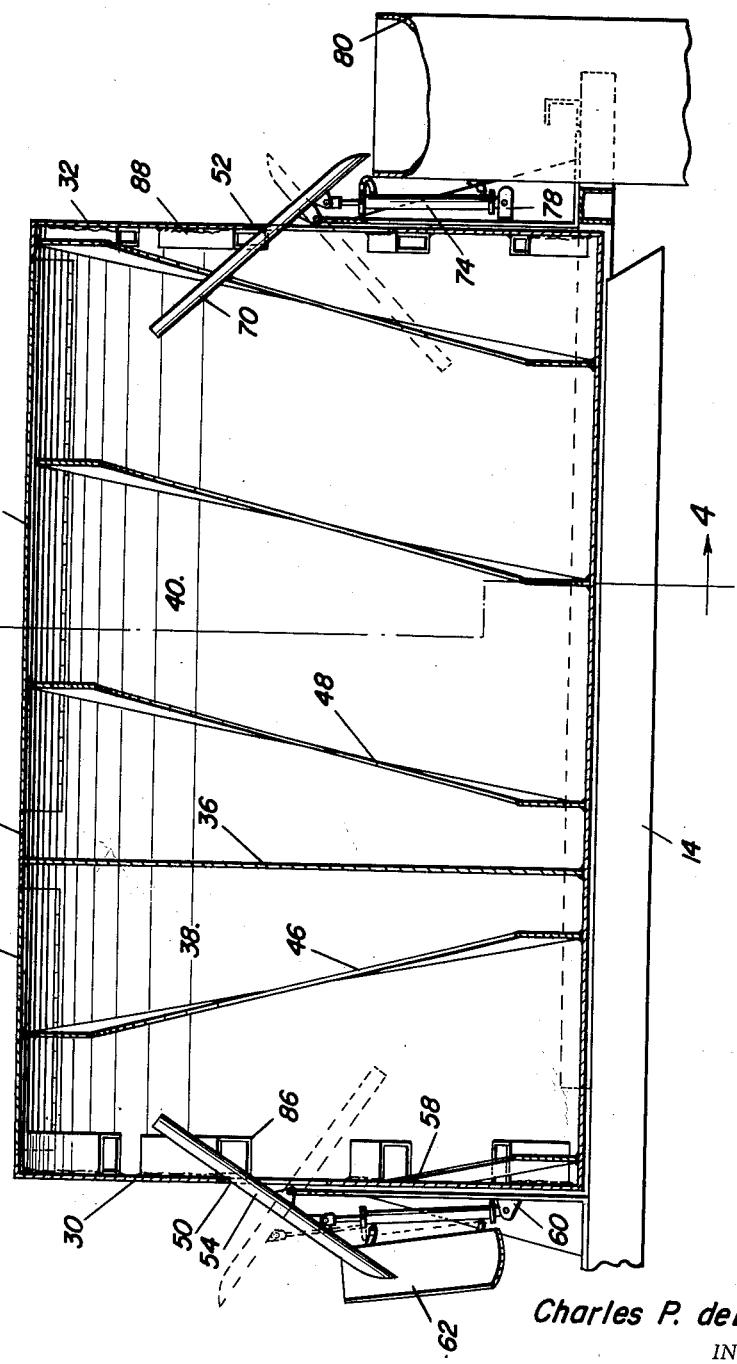
FIGURE 3 is a longitudinal, vertical sectional view taken substantially upon a plane passing along section line 3—3 of FIGURE 2 illustrating the internal construction of the drum.

The end wall 30 is provided with an opening 50 therein and the end wall 32 is provided with a similar opening 52 therein. Disposed in the opening 50 is an elongated pivotal deflector plate 54 or discharge member that is pivotally supported by lugs 56 carried by a support 57. The inner end of the member 54 which is in the form of a generally U-shaped chute in cross-section extends interiorly of the compartment 38 and the outer end thereof extends forwardly of the end wall 30. Attached to the outer end portion on the member 54 is a hydraulic piston and cylinder assembly 58 having one end attached to lugs 60 on the support 57 whereby expansion and retraction of the piston and cylinder assembly 58 will pivot the discharge member 54 from a position as illustrated in full line in FIGURE 3 to a position illustrated in dotted line in FIGURE 3.

Mounted in underlying relation to the lower end of the discharge member 54 when in its lowermost position is an inclined discharge chute 62 supported by suitable brackets and extending laterally of the drum for discharge into the top of a cylindrical spreader assembly generally designated by numeral 64 and which includes a cylindrical member 66 having a rotatable broadcast plate 68 at the bottom thereof with said broadcast spreader being more fully disclosed in copending application Serial No. 815,-970, filed May 26, 1959.

At the rear of the cylindrical drum 12, there is provided a pivotal discharge member 70 generally in the form of a trough having a shallow U-shaped configuration in cross-section. The discharge member 70 is supported from a support rod 71 by brackets 72 or lugs and the inner end of the discharge member 70 is disposed interiorly of the compartment 40 and the outer end thereof is disposed outwardly of the rear end wall 32. A hydraulic piston and cylinder assembly 74 is connected to the bottom of the discharge member 70 outwardly of the end wall 32 by virtue of lugs 76 fixedly secured to the undersurface of the discharge member 70. The other end of the piston and cylinder assembly 74 is attached to brackets or lugs 78 carried by support rod 71 whereby the discharge member 70 may be pivoted between the positions illustrated in full and dotted lines in FIGURE 3. When the discharge member 70 is in full line position, the lower outer end thereof is disposed immediately above a cylindrical member 80 forming a rear spreader mechanism generally designated by numeral 82 and which includes a rotatable broadcasting spreader plate 84, the details of the spreading mechanism being fully disclosed in the aforementioned copending application.

When the discharge members 54 and 70 are in their dotted line position, no material will be discharged through the openings 50 and 52. For discharging the material, the end wall 30 is provided with hollow boxlike projections 86 which are tubular with one open end and similar projections 88 are provided on the end wall 32. These projections 88 are in the nature of scoops which will scoop up the material from the bottom and then when at an upper position will dump the material onto the top surface of the discharge member 70 thus discharging the material outwardly at the end walls of the cylindrical drum.

The spreader plates 68 and 84 are driven by suitable hydraulic motors and also, one manner of driving the drum 28 about its longitudinal axis is by powering the rollers 34 such as by virtue of a hydraulic motor 90 and a suitable connection to the rollers 34.

The charging doors 42 and 44 may be any suitable shape and preferably are sufficiently large to enable the hopper or cylindrical drum to be loaded by various means such as a tractor attached front end loader or the like or a front end loader attached to another truck type vehicle. The hopper or drum is quite similar to a conventional concrete mixer drum except that the drum is divided and provided with a novel discharge chute which is controlled by an electrical and hydraulic system such as is disposed in copending application Serial No. 2,240, filed January 13, 1960.

Each mixing compartment has the mixing blades and also the discharge projections which are loaded when they are located at the bottom of a revolution and angled so that they retain the material until they approach the top of the revolution whereby the material then flows by gravity onto the discharge chute. If the discharge chute slopes toward the inside of the drum such as in the dotted line position, the material simply falls back into the drum and when the discharge chute slopes toward the outside, such as the full line position, the material is discharged.

The driving method for the drum may be the conventional method of turning the drum which is by means of a chain drive, the chain running entirely around the drum and driven by a small sprocket gear which is controlled by means of a manual clutch. Preferably, the drum rotation of the present invention will be controlled by means of the conventional clutch or if driven by the hydraulic motor, by means of a manual hydraulic valve.

In this invention, the material is conveyed in the drum and mixed in the drum and the material is discharged after mixing either by use of the discharge chute or by reversing the rotation of the cylinder. The dual drum mixer discharges to the opposite end thereof or the material could be mixed in the first half of the drum and discharged into the second half of the drum for a second period of mixing.

In explaining one very advantageous use of the present invention, it is pointed out that the present-day trend in the colder sections of the country when using chemicals on roadways is to mix calcium chloride with sodium chloride because calcium chloride acts at lower temperatures than sodium chloride and also acts faster. However, it costs approximately 60% more than sodium chloride and therefore it is more economical to mix the two ingredients than to use only calcium chloride. With conventional spreaders, one of the big problems is how to mix the two salts. Present methods are rather crude and expensive and consist primarily of laying the two salts on a smooth pavement and then working them with a grader blade until the operator thinks he has mixed them. Another conventional procedure is by running the two salts over a belt conveyor in the right proportion and as they fall off at the end of the belt into a stock pile they tend to become mixed. With the present invention, the desired proportions are carefully loaded into the cylinder and a perfect mixture is accomplished by rotation of the cylinder. Furthermore, even abrasives to be spread for snow and ice control are always mixed with a certain amount of chemicals and again this can be accomplished by the cylindrical drum.

Without the partition and with a continuous spiral blade on the interior of the drum, it is only necessary to reverse the drum to feed either a spreader mounted in the rear of the truck or a spreader mounted at the left front side of the truck. But with the divider in the drum, chemicals may be placed in the rear compartment and abrasives in the front compartment. With this arrangement, a driver could go out and spread chemicals such as is employed normally and should he find a condition where he needed traction he could also spread abrasives under the front and rear wheels. It would also be possible with two compartments and two spreaders to load each compartment with different materials and precision control spreading such as disclosed in previous applications mentioned before, achieve the desired spread per mile of both materials, not by any pre-mixing but by actually applying the two desired materials to the road surface. For instance, assuming it is desired to spread 400 lbs. per mile total of which 100 lbs. is to be calcium chloride and 300 lbs. sodium chloride, it is possible to set one spreader at 100 lbs. and the other spreader at 300 lbs. per mile, the result would be a road surface with the exact amount of both materials spread thereon. The precision control of such spreaders has been previously disclosed in copending applications.

Also, each spreader may have a control means for controlling operation of the discharge chute so that material at all times is disposed in the rotatable spreader. Also, a warning device may be provided for actuation by the spreader assembly when the supply of material has been exhausted. The details of this arrangement also has been disclosed in the aforementioned copending application.

Also, with the spreader assembly of the present invention, it is possible to use a conventional mixer drum such as employed in concrete transit mixers thus enabling such mixers to be used more efficiently. If desired, the drum may be easily removed or lifted from the truck frame thus enabling a conventional vehicle dump body or the like to be disposed thereon for more effective use of the trucks thus eliminating substantial idle equipment such as occurs especially with concrete mixers since concrete cannot be poured during periods of adverse weather conditions which then would require the use of a material spreader such as during periods when snow and ice cover the ground and roadway surfaces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A material spreader comprising, in combination, mobile frame structure movably supported for traversing a given course, a substantially cylindrical drum defined by a peripheral side wall portion and spaced apart end wall portions, means for mounting said drum on said frame structure for rotation about a generally horizontally disposed longitudinal axis which extends in a direction substantially common to the direction which the frame structure travels while traversing the given course with one end wall portion of the drum being disposed forwardly and the other end wall portion thereof being to the rear of said frame structure, partition means disposed within the interior of said drum intermediate the end wall portions thereof, said partition means extending generally transversely relative to the longitudinal axis of rotation of the drum and terminating in engagement with the peripheral side wall portion thereof to divide the interior of the drum into a plurality of non-communicating compartments, access means in the peripheral side wall portion of the drum opening into each of the compartments to enable material to be placed within and maintained separate in each of the compartments, each of the end wall portions of the drum having an aperture therein disposed in alignment with the longitudinal axis of rotation of the drum for enabling material to be discharged from the respective compartment through the adjacent end wall portion, mixing and conveying means disposed within the confines of each of the compartments of the drum for effectively mixing and conveying material from the access means through the confines of each of the compartments of the drum toward the respective aperture in the end wall portions thereof, means for rotating said drum in a direction about the longitudinal axis to pass material within each of the compartments toward the adjacent end wall portion of the drum and in an opposed direction to urge material to pass toward the partition within the drum, means carried by each of the end wall portions of the drum within the confines of the respective compartment and adjacent the aperture in the end wall portion for passing material from within the confines of the respective compartment of the drum to the aperture in the adjacent end wall portion, and discharge means pivotally mounted to each of the end wall portions of the drum for movement between operative and inoperative positions for effectively opening and closing the aperture in the respective end wall portion of the drum, said discharge means projecting through the respective aperture in the end wall portion for enabling material to pass from within the confines of the adjacent compartment in the drum through the aperture in the respective end wall portion when the discharge means is in the operative open position.

2. The material spreader as set forth in claim 1 wherein said mixing and conveying means comprises spiral deflector blade structure disposed within the confines of each of the compartments of the drum.

3. The material spreader as set forth in claim 1 together with a spreader device disposed subjacent to each of the discharge means for receiving material therefrom and for broadcasting material generally laterally relative to the given course.

References Cited in the file of this patent

UNITED STATES PATENTS

| | | |
|---|---|---|
| 1,420,757 | Ryan | June 27, 1922 |
| 2,436,959 | Ekin et al. | Mar. 2, 1948 |
| 2,684,786 | Silver et al. | July 27, 1954 |
| 2,729,435 | Harbers et al. | Jan. 3, 1956 |
| 2,797,070 | Winn et al. | June 25, 1957 |